Jan. 30, 1968   J. B. NICOL   3,366,242
TREATMENT OF SEWAGE AND LIKE INDUSTRIAL WASTES
Filed Dec. 28, 1964   2 Sheets-Sheet 1

INVENTOR
JAMES B. NICOL

BY Larson and Taylor

ATTORNEYS

Jan. 30, 1968   J. B. NICOL   3,366,242
TREATMENT OF SEWAGE AND LIKE INDUSTRIAL WASTES
Filed Dec. 28, 1964   2 Sheets-Sheet 2

INVENTOR
JAMES B. NICOL

BY *Larson and Taylor*

ATTORNEYS

United States Patent Office 3,366,242
Patented Jan. 30, 1968

3,366,242
TREATMENT OF SEWAGE AND LIKE
INDUSTRIAL WASTES
James Blackburn Nicol, Yoker, Glasgow, Scotland, assignor to Drysdale & Company Limited, Yoker, Glasgow, Scotland, a corporation of Great Britain and Northern Ireland
Filed Dec. 28, 1964, Ser. No. 421,229
Claims priority, application Great Britain, Jan. 9, 1964, 984/64
13 Claims. (Cl. 210—195)

This invention is concerned with improvements relating to the treatment of sewage and like industrial wastes, hereinafter referred to, for simplicity, as sewage, and, more particularly, to the treatment of sewage by the process known as the activated sludge process. In this process the sewage to be treated is supplied to a treatment chamber which may be of concrete or steel construction and in which the sewage is aerated by the passage therethrough of air or oxygen. The organic matter in the sewage is digested in the presence of the oxygen and bacteria, and other micro-organisms, the bacterial population, assuming the oxygen supply is sufficient, multiplying to a maximum value after which the bacterial activity declines as the available organic matter is digested. The activated sludge produced during the above-described action is transferred to a settlement chamber at a pre-determined stage in the bacterial growth cycle, which stage is dependent on the specific type of activated sludge treatment process being used. In the specific type of activated sludge process known as the extended aeration activated sludge treatment process, to which the present invention is especially applicable, aeration in the treatment chamber is allowed to proceed until the bacterial activity is relatively low at which stage the matter stored in dead cells is utilized since the supply of organic matter has been virtually completely digested. The activated sludge in this state readily flocculates so that the sludge, when transferred to the settlement chamber, flocculates and settles out from the associated liquid which is removed from the settlement chamber as effluent substantially free of putrescible material. The activated sludge in the settlement chamber may, if required, be returned to the treatment chamber to initiate the digestion process of the next following supply of sewage.

In hitherto known constructions of plant for performing the above-described treatment process the treatment and settlement chambers are separated by a dividing partition but are interconnected, for the flow of sludge from the treatment chamber to the settlement chamber, by an opening or openings formed in the partition, the effluent from the settlement chamber flowing over a weir and hence to waste. Such a construction can readily be arranged to operate satisfactorily if the hydraulic load on the plant and the biochemical oxygen demand of the sewage supply remains substantially constant, the biological oxygen demand being defined as the quantity of oxygen which is taken up by a fixed quantity of sewage in a given period and is a measure of the strength of the sewage. If, as is generally the case, however, a fluctuating or shock hydraulic load is applied to the plant, which may be accompanied by fluctuations in the value of the biochamical oxygen demand of the sewage, the efficiency of the plant, in the sense or the quality of the effluent from the settlement tank, is reduced since the plant operates on the displacement principle that if, say, 1 gallon of liquid sewage is supplied to the treatment chamber, 1 gallon of sludge is displaced from the treatment chamber to the settlement chamber and 1 gallon of effluent is displaced over the weir from the settlement chamber, the detention period of the sewage in the treatment chamber thus being varied with a consequent departure from the pre-determined stage in the bacterial growth cycle at which the activated sludge is transferred to the settlement chamber.

It is the primary object of the present invention substantially to overcome the above-described disadvantage by the provision of an activated sludge sewage treatment plant which may operate with the minimum of attention and the liquid effluent from which is of substantially constant quality irrespective of fluctuations or shocks in the hydraulic load or fluctuations in the biochemical oxygen demand of the sewage.

According to a first embodiment of the present invention, the sewage treatment plant, for the treatment of sewage by the activated sludge process, comprises a treatment chamber which also constitutes a combined pre-digester and buffer chamber, means for aerating the sewage in the treatment chamber, a settlement chamber, an air lift through which the treatment chamber is in communication with the settlement chamber, and the variation in flow rate through which is proportional to, but less than, the variation in hydraulic load on the plant, and outlet means by which treated effluent may be withdrawn from the settlement chamber.

Hydrostatic sludge return means may connect the lower portion of the settlement chamber with the treatment chamber, said means preferably comprising a pipe mounted with the lower end thereof in communication with the lower portion of the settlement chamber and with the upper end thereof in communication with the treatment chamber, the height setting of the upper end of the hydrostatic sludge return pipe preferably being adjustable.

A weir, over which scum may pass from the settlement chamber to the treatment chamber, is preferably disposed between the settlement chamber and the treatment chamber, the weir preferably permitting overflow from the treatment chamber to pass, over the weir, to the settlement chamber.

According to a second embodiment of the present invention, the sewage treatment plant, for the treatment of sewage by the activated sludge process, comprises a treatment chamber, a combined pre-digester and buffer chamber distinct from the treatment chamber, means for aerating the sewage in the treatment chamber and the combined pre-digester and buffer chamber, a settlement chamber, an air lift through which the combined pre-digester and buffer chamber is in communication with the treatment chamber, and the variation in flow rate through which is proportional to, but less than, the variation in hydraulic load on the plant, means to transfer activated sludge from the treatment chamber to the settlement chamber, and outlet means by which treated effluent may be withdrawn from the settlement chamber.

Hydrostatic sludge return means may connect the lower portion of the settlement chamber with the combined pre-digester and buffer chamber, said means preferably comprising a pipe mounted with the lower end thereof in communication with the lower portion of the settlement chamber and with the upper end thereof in communication with the combined pre-digester and buffer chamber, the height setting of the upper end of the hydrostatic sludge return pipe preferably being adjustable.

A weir, for overflow from the combined pre-digester and buffer chamber to pass to the treatment chamber, is preferably disposed between the combined pre-digester and buffer chamber and the treatment chamber.

With reference to both the first and second embodiments there may be a further weir over which treated effluent may flow from the settlement chamber to the outlet means, the further weir being of V-shape so that for a small variation in the flow rate of activated sludge from the treatment chamber to the settlement chamber there is a large variation in the liquid level in the settlement chamber.

In order that the invention may be more clearly understood and more readily carried into effect the same will now be described more fully with reference to the accompanying drawings which are diagrammatic in character and in which.

Figure 1:
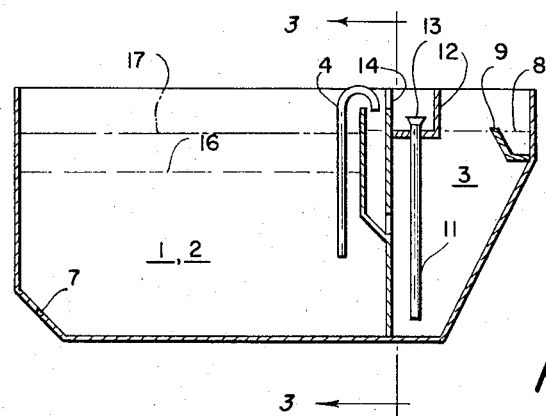
FIG. 1 is a sectional elevation of the first embodiment in which the combined pre-digester and buffer chamber is constituted by the treatment chamber.
Figure 2:
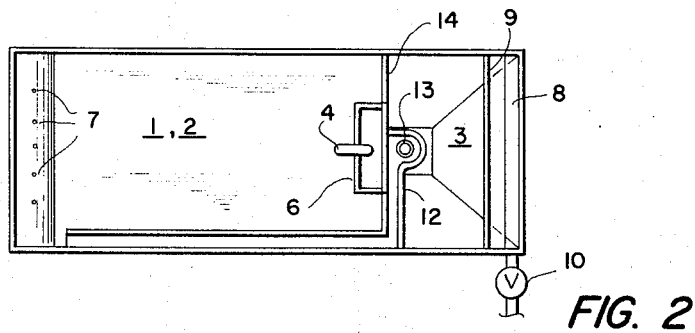
FIG. 2 is a plan veiw of the embodiment illustrated in FIG. 1.
Figure 3:
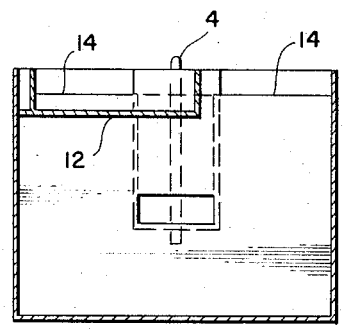
FIG. 3 is a sectional end view on the line 3—3 of FIG. 1.

Referring to the drawings, 1 denotes a chamber which constitutes a treatment chamber, 2 denotes a chamber which constitutes a combined pre-digester and buffer chamber, and 3 denotes a chamber which constitutes a settlement chamber. With reference to the first embodiment, the chamber 2 is constittued by the chamber 1 while, with reference to the second embodiment, the chamber 2 is distinct from but is located in side-by-side relationship with, the chamber 1.

The chamber 3 is located in side-by-side relationship with the chamber 1.

With reference to the first embodiment, an air lift 4, through which the chamber 1 is in communication with the chamber 3 serves for the transfer of activated sludge from the chamber 1 to the chamber 3 while, with reference to the second embodiment, an air lift 5 through which the chamber 2 is in communication with the chamber 1 serves for the transfer of activated sludge from the chamber 2 to the chamber 1.

Referring to the second embodiment activated sludge may flow from the chamber 1 to the chamber 3 over a weir 6 which is constituted by the dividing wall between the chambers 1 and 3.

With reference to both embodiments, aeration points 7 by means of which oxygen may be admitted to the chambers 1, 2 are mounted in the base of the chambers 1, 2.

An effluent trough 8 is mounted in the chamber 3, effluent from the chamber 3, when the plant is in use, flowing over an efffluent weir 9 which constitutes one side of the trough 8 and into the effluent trough 8 from which the efflluetn may be withdrawn to waste through an outlet valve 10.

With reference to the first embodiment, should there be an increase in the hydraulic load on the plant the liquid level in the chamber 1 rises thereby causing an increase in the rate of transfer of activated sludge, through the air lift 4, from the chamber 1 to the chamber 3 since the delivery head of the air lift 4 is thereby reduced and the pressure at the inlet to the air lift 4 is increased. The increase in the flow rate through the air lift 4 is proportional to, but considerably less than, the increase in the hydraulic load on the plant so that the plant is not of the displacement type, the detention period of the sewage in the chamber 1 being maintained within narrow limits relative to the detention peroid, for the particular oxygen supply rate in operation, corresponding to the desired bacterial activity of the activated sludge at transfer to the chamber 3. Conversely, should there be a reduction in the hydraulic load on the plant there is a reduction, in the flow rate through the air lift 4 which is proportional to, but considerably less than, the reduction in the hydraulic load on the plant.

In consequence, therefore, since relative to the displacement type of treatment plants the detention period of the sewage in the chamber 1 of the plant is maintained within closer limits of the detention period corresponding to the stage in the bacterial growth cycle at which the activated sludge is transferred to the chamber 3 when the plant is operating as intended, and the rate at which the sludge and effluent passes through the chamber 3 is maintained below the value at which at least a proportion of the sludge in the chamber 3 would be prevented from settling out from the effluent and would therefore pass from the chamber 3 over the effluent weir 9 with the effluent, fluctuations in the sewage input to the plant do not result in a reduction in the quality of the effluent from the plant.

With reference to the second embodiment the mode of operation of the plant is similar to that described above and differs only in the respects that the air lift 5 operatively transfers the sludge from the chamber 2 to the chamber 1 the transfer of activated sludge from the chamber 1 to the chamber 3 being by way of the weir 6. This second embodiment is especially applicable where fluctuations in the biochemical oxygen demand of the sewage to be treated or shocks in the hydraulic load in the plant occur. Referring again to both embodiments, hydrostatic sludge return means comprising a substantially vertical pipe 11 the lower end of which is, when the plants is in use, in communication with activated sludge settled in the chamber 3 and the upper end of which is so disposed as to discharge sludge into a trough 12 which serves to return the sludge to the chamber 2 is mounted in the plant. The height setting of the upper end of the pipe 11 is adjustable by means of an adjustable nozzle 13 mounted thereto so that the rate of return flow of activated sludge to the chamber 2 which is dependent on the difference in level of the upper end of the pipe 11 and the liquid level in the chamber 3 may be varied. The hydrostatic sludge return means may alternatively comprise an orifice or orifices (not shown) formed in a wall of the chamber 3 and in communication with the chamber 2, the area of each orifice being adjustable so that the rate of return flow of activated sludge to the chamber 2 may be varied.

The weir 9 is of wedge-shape so that for a small variation in the flow rate of activated sludge form the chamber 1 to the chamber 3, through the air lift 4 with reference to the first embodiment, or over the weir 6 with reference to the second embodiment, there is a comparatively large variation in the liquid level in the chamber 3 with, consequently, a correspondingly large variation in the flow rate of activated sludge through the hydrostatic sludge return pipe 11, or the hydrostatic sludge return orifice or orifices, from the chamber 3 to the chamber 1 with reference to the first embodiment, or the chamber 2 with reference to the second embodiment.

Referring to the first embodiment, a scum removal weir 14 which is constituted by the dividing wall between the chambers 1 and 3 is disposed at a higher level than the effluent weir 9 and serves to permit the transference of scum and surface liquid from the chamber 3 to the chamber 1. Periodically, when it is desired to transfer scum from the chamber 3 to the chamber 1, the valve 10 is closed thereby stopping the flow of treated effluent from the effluent trough 8. Since, however, the air lift 4 remains in operation activated sludge continues to be transferred from the chamber 1 to the chamber 3 through the air lift 4. The liquid level in the chamber 3 therefore rises until when it reaches the level of the scum removal weir 14 scum and surface liquid is carried over the weir 14 from the chamber 3 to the chamber 1. After the scum has been removed from the chamber 3 in this manner the valve 10 is re-opened thereby causing the plant to return to normal operation.

With reference to the first embodiment an overflow weir constituted by the scum removal weir 14 permits a flow of activated sludge over said weir from the chamber 1 to the chamber 3, with a resultant temporary reduction in the quality of the effluent from the plant should an increase in the hydraulic load on the plant be sufficient to raise the liquid level in the chamber 1 above the maximum permitted level, at which level the weir 14 is disposed.

With reference to the second embodiment an overflow weir 15 constituted by the dividing wall between the chambers 2, 1 likewise permits a flow of activated sludge over the weir 15 from the chamber 2 to the chamber 1 should an increase in the hydraulic load on the plant be sufficient to raise the liquid level in the chamber 2 above the maximum permitted level, at which level the weir 15 is disposed.

Figure 4:
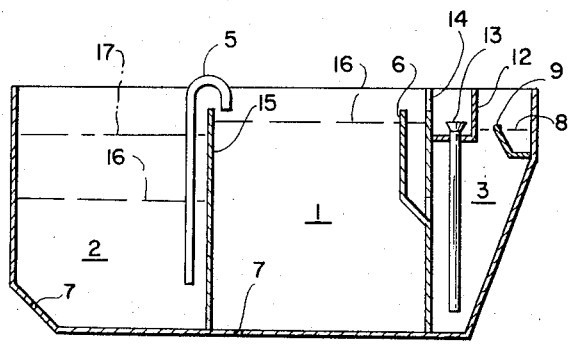
FIG. 4 is a sectional elevation of the second embodiment in which the combined pre-digester and buffer chamber is distinct from the treatment chamber.
Figure 5:
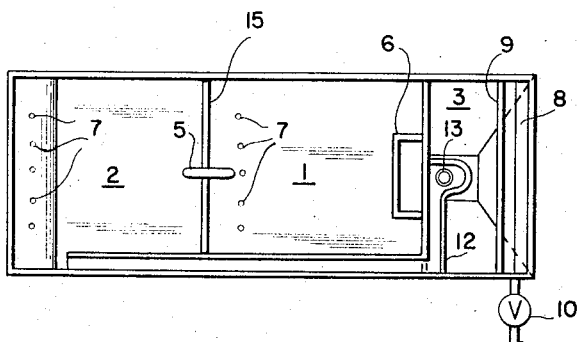
FIG. 5 is a plan view of the embodiment illustrated in FIG. 4.

Referring to FIGS. 1 and 4 of the drawings, 16 denotes liquid levels during normal operation of the plant and 17 denotes maximum liquid levels.

What is claimed is:

1. Sewage treatment plant, for the treatment of sewage by the activated sludge process, comprising a treatment chamber, a pre-digester and buffer chamber which is constituted by said treatment chamber, means for aerating sewage in the treatment chamber, a settlement chamber, an air lift including means for continuously transferring liquid from said treatment chamber to said settlement chamber at a flow rate proportional to the level of liquid in the treatment chamber, the said air lift providing the sole means for transferring liquid from the said treatment chamber to the said settlement chamber, the variation in flow rate through the said air lift, due to the variation in liquid level in said treatment chamber resulting from a variation in the flow rate of sewage to the treatment chamber, being proportional but less in magnitude than the variation of flow to and from said treatment chamber which results from the variation in hydraulic load on the plant, outlet means for removing treated effluent from said settlement chamber.

2. Plant according to claim 1 including hydrostatic sludge return means for connecting the lower portion of said settlement chamber with said treatment chamber.

3. Plant according to claim 2 in which said hydrostatic sludge means comprises a pipe, the lower end of said pipe being in communication with the lower portion of said settlement chamber and the upper end of said pipe being in communication with said treatment chamber.

4. Plant according to claim 3 in which the height setting of said upper end of said hydrostatic sludge return pipe is adjustable.

5. Plant according to claim 1 having a weir between said settlement chamber and said treatment chamber and over which scum may pass from said settlement chamber to said treatment chamber.

6. Plant according to claim 5 in which said weir is so formed as to permit overflow from said treatment chamber to pass, over said weir, to said settlement chamber.

7. Plant according to claim 1 having a further weir over which treated effluent flows from said settlement chamber to said outlet means, said further weir being inclined upwardly towards the treatment chamber so that for a given variation in the flow rate of activated sludge from said treatment chamber to said settlement chamber there is a larger variation in the liquid level in said settlement chamber.

8. Sewage treatment plant, for the treatment of sewage by the activated sludge process, comprising a treatment chamber, a combined pre-digester and buffer chamber distinct from said treatment chamber, means for aerating sewage in said treatment chamber and said combined pre-digester and buffer chamber, a settlement chamber, an air lift including means for continuously transferring liquid from said pre-digester and buffer chamber to said treatment chamber at a flow rate proportional to the level of liquid in said pre-digester and buffer chamber, the said air lift providing the sole means for transferring liquid from said combined pre-digester and buffer chamber to said treatment chamber, the variation in flow rate through said air lift, due to the variation in liquid level in said pre-digester and buffer chamber resulting from a variation in the flow rate of sewage to said pre-digester and buffer chamber, being proportional to but less in magnitude than the variation of flow to and from said pre-digester and buffer chamber which results from the variation in hydraulic load on the plant, means for transferring activated sludge from said treatment chamber to said settlement chamber, and outlet means for re-removing treated effluent from said settlement chamber.

9. Plant according to claim 8 including hydrostatic sludge return means for connecting the lower portion of said settlement chamber with said combined pre-digester and buffer chamber.

10. Plant according to claim 9 in which said hydrostatic sludge return means comprises a pipe, the lower end of said pipe being in communication with the lower portion of said settlement chamber and the upper end of said pipe being in communication with said combined pre-digester and buffer chamber.

11. Plant according to claim 10 in which the height setting of said upper end of said hydrostatic sludge return pipe is adjustable.

12. Plant according to cliam 8 having a weir between said combined pre-digester and buffer chamber and said treatment chamber for overflow from said combined pre-digester and buffer chamber to pass to said treatment chamber.

13. Plant according to claim 8 having a further weir over which treated effluent flows from said settlement chamber to said outlet means, said further weir being inclined upwardly towards the treatment chamber so that for a given variation in the flow rate of activated sludge from said treatment chamber to said settlement chamber there is a larger variation in the liquid level in said settlement chamber.

References Cited

UNITED STATES PATENTS

| 1,790,975 | 2/1931 | Dallas et al. | 210—201 X |
| 1,893,623 | 1/1933 | Imhoff | 210—197 X |
| 2,427,886 | 9/1947 | Walker | 210—197 |
| 2,616,848 | 11/1952 | Griffith | 210—15 X |
| 2,834,466 | 5/1958 | Hament | 210—220 X |

FOREIGN PATENTS 934,146  8/1963  Great Britain.

REUBEN FRIEDMAN, *Primary Examiner.*

J. DE CESARE, *Assistant Examiner.*